United States Patent
Purdy

(10) Patent No.: US 7,628,519 B2
(45) Date of Patent: Dec. 8, 2009

(54) COLUMNAR LIGHTING SYSTEM FOR TRAILERS

(76) Inventor: Jeffrey Purdy, 12 Wade Hampton Dr., Beaufort, SC (US) 29901-2124

( * ) Notice: Subject to any disclaimer, the term of this patent is extended or adjusted under 35 U.S.C. 154(b) by 481 days.

(21) Appl. No.: 10/908,170

(22) Filed: Apr. 29, 2005

(65) Prior Publication Data
US 2006/0120093 A1    Jun. 8, 2006

Related U.S. Application Data

(60) Provisional application No. 60/593,052, filed on Dec. 3, 2004.

(51) Int. Cl.
*B60Q 1/22* (2006.01)
(52) U.S. Cl. .................. 362/485; 362/243; 362/303; 362/347; 362/477; 362/541; 362/542; 340/431; 280/414.1
(58) Field of Classification Search .......... 362/240, 362/485, 477, 551, 296, 243, 245, 247, 300, 362/303, 305, 307, 310, 341, 347, 367, 516, 362/540, 517, 518, 519, 541, 542, 546; 280/414.1; 340/431
See application file for complete search history.

(56) References Cited

U.S. PATENT DOCUMENTS

| | | | | |
|---|---|---|---|---|
| 3,502,861 A * | 3/1970 | Evans | .................. | 362/477 |
| 3,784,974 A * | 1/1974 | Hamashige | .................. | 340/464 |
| 3,902,057 A * | 8/1975 | La Violette | .................. | 362/485 |
| 4,051,361 A * | 9/1977 | Lichon et al. | ................ | 362/211 |
| 4,715,768 A * | 12/1987 | Capps | ......................... | 414/535 |
| 5,097,397 A * | 3/1992 | Stanuch et al. | ............. | D10/114 |
| D351,115 S * | 10/1994 | Valdez | ...................... | D10/114 |
| 7,108,408 B2 * | 9/2006 | Tinklenberg | ................ | 362/485 |
| 2005/0047156 A1 * | 3/2005 | Cullinan | ..................... | 362/485 |
| 2005/0263982 A1 * | 12/2005 | Mickley | .................. | 280/414.1 |

* cited by examiner

*Primary Examiner*—Sharon E Payne
*Assistant Examiner*—Mary Zettl
(74) *Attorney, Agent, or Firm*—Calhoun Thomas, III; Samuel Alexander Long, Jr.

(57) ABSTRACT

A light system is disposed to be located on top of guide poles on either side of a trailer. The light system is in-line with the guide pole and may almost appear to be a part of the poles. The elevated light system allows for the brake lights to be more easily seen by following drivers and it normally keeps the brake lights from being immersed in water when the trailer is used in loading or unloading a boat or other marine craft. Additionally, in comparison with lights attached to the side of a guide pole, the in-line nature of the light system makes it less likely that the light will be knocked off or damaged when backing a trailer into a tight garage opening. Furthermore, a tell-tale lens is located opposite the primary lens and it allows the driver to be able to verify that the lights are working.

1 Claim, 4 Drawing Sheets

COLUMNAR LIGHTING SYSTEM FOR TRAILERS

RELATED APPLICATIONS

Not Applicable.

FEDERALLY SPONSORED RESEARCH OR DEVELOPMENT

Not Applicable.

REFERENCED OR INCORPORATED MATERIAL

Not Applicable

BACKGROUND OF INVENTION

The use of trailers to transport boats, other marine craft and other items is old art. More recently, particularly with respect to loading a boat on a trailer that has been backed into the water, upright poles mounted on either side of a trailer have been used to facilitate guiding a boat onto such a trailer. These poles are commonly called "guide poles," "guide-ons" or "bump rails." They are often made of PVC plastic but they may be made from a wide variety of hard plastic, wood, metal or similar materials. These guide poles are common on boat trailers and similar devices. If a trailer does not come with guide poles, there are kits available that allow easy mounting of add-ons. Guide poles commonly are mounted on a trailer in such a way that they tilt slightly outward from the center of the trailer to better conform to the V-shape of a typical boat hull.

Guide poles typically are plain tubes that do not contain any light structures. However, it is the case that people have mounted brake and/or turn signal light structures to the side of the top portions of these poles. These side mounted lights have worked with varying degrees of success. They are not easily attached to the guide poles and commonly leave exposed wiring running down they top of the tube opening. Also, they often add additional width to the trailer and can be easily knocked off when backing a trailer into a tight garage.

Notwithstanding these problems, location of brake and turn-signal light systems on the guide poles can present an obvious advantage compared to typical trailer lights. The typical trailer comes with brake and turn signal lights attached to the left and right rear corners of the end of the trailer. These lights often are immersed in water in the process of loading and unloading a boat. Often this contact results in thermal shock failure due to the substantial difference in temperature between the hot light fixture and the colder water. Also these conventional trailer lights are subject to corrosive and other deteriorating effects. In the case of a large boat that protrudes off the end of a small trailer, such brake and signal lights may be obscured by the end of the boat. Many years ago various governmental authorities began requiring cars and similar vehicles to have an extra one or more brake lights located on the upper portion of the vehicle. These extra brake lights had the advantage of being easier to see and typically can be seen even by a car that is one or more cars back. Use of lights located on trailer guide poles have similar advantages and may even be required by relevant governmental laws, regulations and/or ordinances. The present invention is directed to an improved manner of mounting such lights on guide poles.

SUMMARY OF THE INVENTION

The present invention relates to a lighting system suitable for utilization with trailers for boats and other marine craft, utility vehicles, and generally all items carried on trailer where it is desirable for the lighting system, particularly the tail light, brake light, hazard light and turn signals, to be located at an elevated position, as well as the use of inexpensive components to devise a such a trailer lighting system that is sized and otherwise configured in such a way that it will easily fit on or over the top end of guide poles on a trailer. Positioning the light system at an elevated eye level provides for easier viewing by those following the trailer and may enhance compliance with certain legal requirements in many jurisdictions. The lighting system of the present invention is especially suitable for keeping such systems from submersion when trailers are backed into water to facilitate unloading or loading of boats and other marine craft. This system addresses the need for tail lights, turn signal lights and brake and hazard lights that have enhanced visibility at night and other times of limited visibility. The present invention has been made to solve several problems with conventional trailer light systems. Conventional trailer lights do not facilitate easy viewing of the lights due to their being positioned so low on the back of a trailer. Additionally, they are subject to repeated immersion in water in typical use with boats and other marine craft. This repeated immersion problem often leads to thermal shock failure as the hot light fixture comes into contact with the much colder water. Additionally, the water typically has a corrosive effect on the components of the conventional trailer lights. The present invention avoids these problems by locating the light system at the top of the guide poles. Additionally, the position and configuration of the present invention in-line with the guide poles reduces the chance that it will be broken off from sticking out too far and increases the protection for the wiring that necessarily runs down the guide pole for connection to the standard trailer wiring system. Additionally, an embodiment of the invention includes a means that allows a driver to see if the light system is working from the driver seat or passenger compartment of the vehicle.

DETAILED DESCRIPTION

Figure 1:
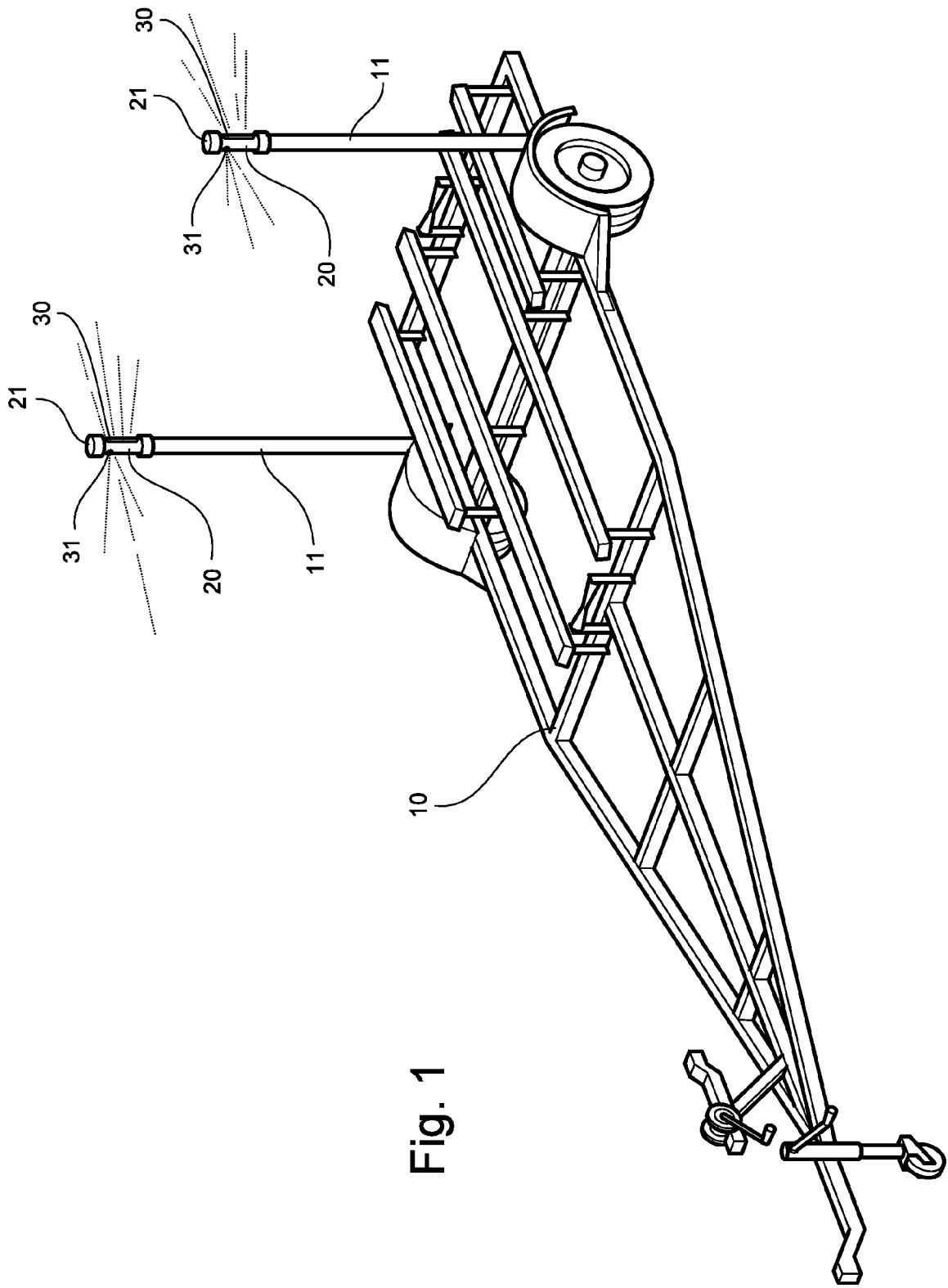
FIG. 1 This is a typical view of a trailer with guide poles with the present invention located at the top of the guide poles.
Figure 2:
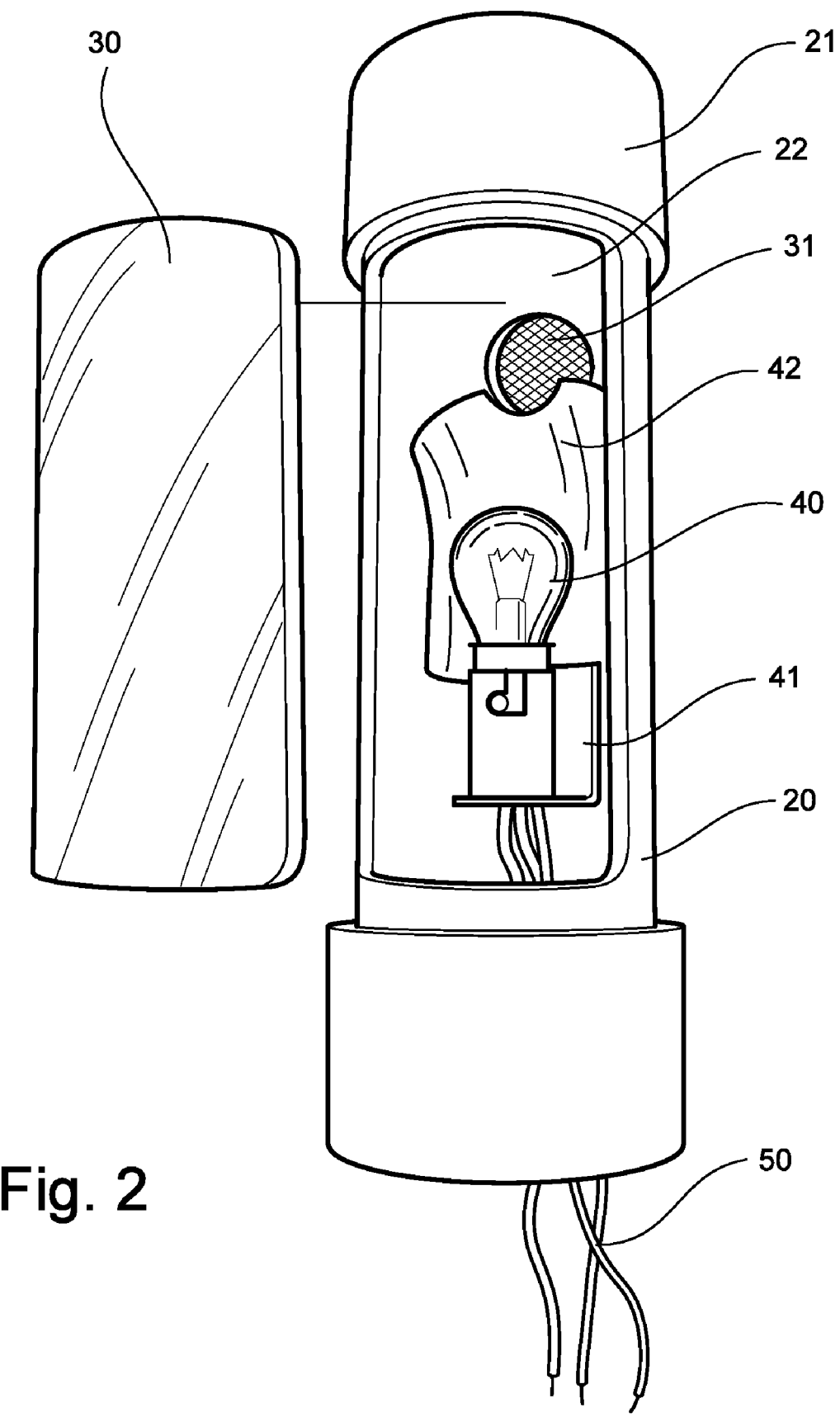
FIG. 2 This is a partially exploded view of the present invention.
Figure 3:
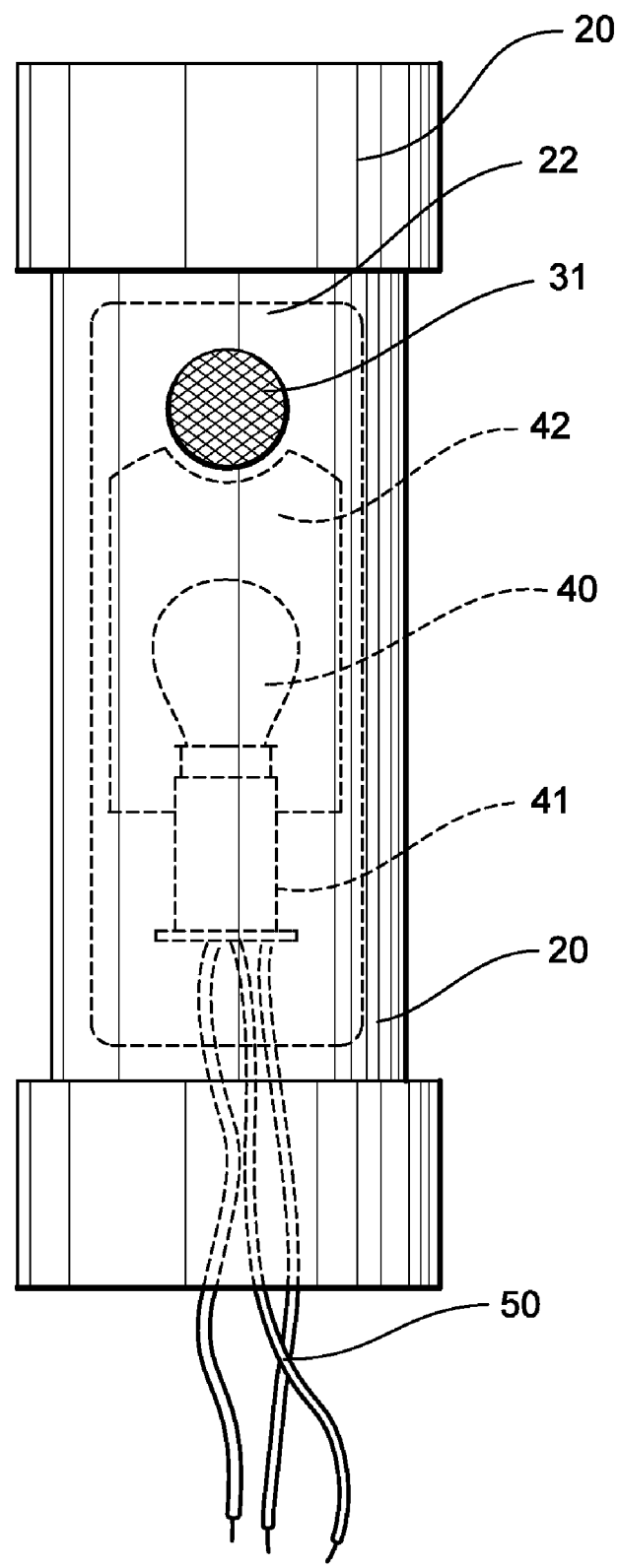
FIG. 3 This is a view as seen from the front of a trailer (internal parts depicted as dotted lines).
Figure 4:
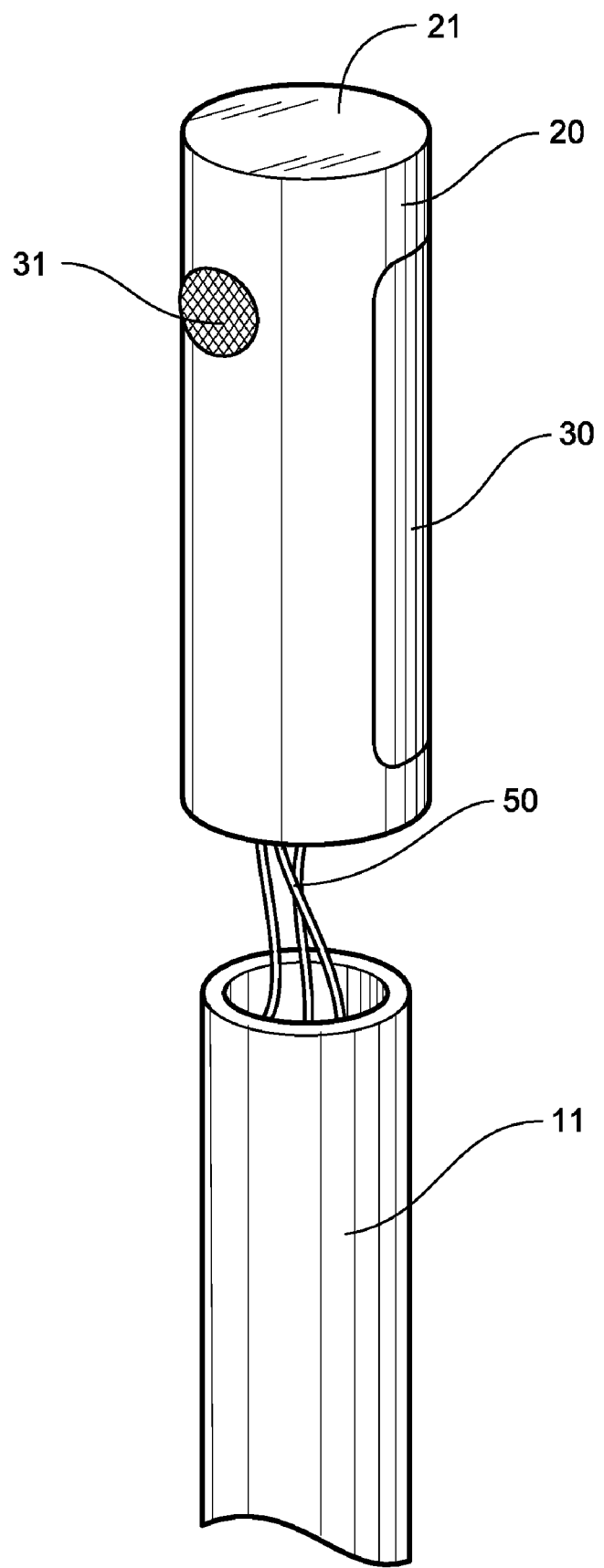
FIG. 4 This is a view of an alternative embodiment with the body of the invention (not including the lens and internal parts) formed as one or two parts, depending on whether the top is a separate fitted part or whether it is molded as a seamless portion of the rest of the body.

It is to be understood by one of ordinary skill in the art that the present discussion is a description of exemplary embodiments only, and is not intended as limiting the broader aspects of the present invention. The following example is provided to further illustrate the invention and is not to be construed to unduly limit the scope of the invention.

The preferred embodiment of the present invention contemplates polyvinyl chloride (PVC), or similar hard plastic, housings (20) each containing a light source (40) and each mounted on top of one of the guide poles (11) typically located on the left and right sides of the rear portion of a trailer (10) for boats or other marine craft. As noted above, these guide poles (11) are well known in the industry. In this embodiment, the housing (20) consists of cylinder with a closed end top (21), however, the invention is not restricted to the cylindrical shape and could be fashioned in any of several shapes. The top (21) may be an integrated piece or it may be a separate cap-like piece that is mounted to the body by adhesive or any of a variety of other standard means. The interior diameter of this cylinder (20) can be sized to be only slightly larger than the exterior diameter of the guide pole (11) cylinder such that it slides securely over the top of the guide pole (11) and, as will be apparent to those skilled in the relevant art, is configured to be easily attached. The material that makes up most of the housing cylinder (20) is typically inexpensive PVC tubing, however, it is certainly not limited to this and could be made of various plastics, metals or other similar materials that are opaque or at least near opaque. This housing cylinder has an opening (22) that is approximately half of one side, after allowing for borders at the top and the bottom. This opening (22) is configured to mate with the primary lens (30) which is typically made of brake-industry standard red translucent plastic. Within the center of the cylindrical tube (20) is mounted an inexpensive, industry standard light source (40). This lamp assembly is a dual filament automotive or marine type lamp assembly. It consists of a low voltage direct current lamp (40), a lamp fixture and a mounting bracket (41). The lamp bulb is an inexpensive, industry standard device available from many dealers. Additionally, the preferred embodiment includes a standard reflector (42) mechanism to direct most of the light toward and through the primary lens (30). This lamp assembly is designed to allow easy mounting of the invention with few or even no tools since the wiring (50) is typically joined by simple wire nuts. This light source is disposed in such a manner that when activated by the towing car's electrical brake-light system, it causes the red primary lens (30) portion of the light system to shine from the top of the guide poles (11) in a fashion similar to the standard manner for all elevated brake lights on almost all cars and trucks. The visibility of the light from the primary lens (30) of the invention, when properly mounted on the top of typical guide poles (11), provides a dramatic improvement on conventional trailer lights. This invention provides tail, brake, turn signal and hazard lights that are higher and typically larger and more visible than conventional and other light options. In the preferred embodiment of this invention, the primary red lens (30) is curved in shape to mate with the curvature of the housing cylinder (20); however, as will be apparent to those schooled in the art, this is not the only configuration that this invention can encompass. The wiring (50) for the invention light source is typically run down through the guide pole (11) and attached to the brake wiring system for the standard brake lights on the left and right corner of almost all trailers used for boats, other marine craft and other items carried on trailers, however, in an alternative embodiment, it could be powered by an independent battery or other electric power generating mechanism.

In addition to the primary lens 930), an additional embodiment adds a second "telltale" lens (31) on the forward side of the cylindrical light housing (20). This lens (31) is typically amber and it serves as a test indicator as to when the light system of the present invention is working. It is visible from the driver's seat as well as the passenger compartment of the vehicle that is towing the trailer. This lens (31) will show the driver that the trailer lights are working properly without having to view them from the rear.

Naturally other materials may be used in the construction of the present invention and these and other modifications and variations may be practiced by one of ordinary skill in the art, without departing from the spirit and scope of the present invention. In addition, it should be understood that aspects of the various embodiments maybe interchanged both in whole and in part. Furthermore, those of ordinary skill in the art will appreciate that the foregoing description is by way of example only, and is not intended to limit the invention to be further described in the claims.

What is claimed is:

1. A guide pole mounted trailer light system apparatus comprising:
    (a) a housing constructed of a PVC guide pole stock, wherein the diameter of said PVC guide pole stock is the same diameter as the PVC guide pole to which the housing is attached and wherein the housing is positioned with the central axis of the PVC guide pole stock in the vertical direction which is in alignment with the PVC guide pole to which the housing is attached;
    (b) a single pair of openings, and only a single pair of openings, disposed on opposite sides of said housing comprising a front side opening and a rear side opening, wherein the front side opening is smaller than the rear side opening but still large enough to be visible to the driver of the vehicle pulling the trailer and the rear side opening is large enough to be visible to following drivers from a much further distance;
    (c) translucent coverings for each opening of said single pair of openings, wherein the translucent coverings over the rear opening on the side of the housing opposite the front of the trailer is covered by a red translucent material and the front opening on the side of the housing closest to the front of the trailer is covered by an amber translucent material;
    (d) a top end piece, removably attached to said housing and fitting over said housing to keep water and other substances out;
    (e) a single electrically powered light source, fixedly mounted inside the housing between the front and rear covered openings, comprising one, and only one, light emitting source which emits light out of the respective front side opening and rear side opening of the housing;
    (f) a shallow, concavely curved reflective surface fixedly attached to a portion of an interior surface of said housing, said portion being located opposite the rear side opening and just below the front side opening, said shallow, concavely curved reflective surface being positioned so as direct more light out of the rear opening and so as not to obstruct light passing forward through the front opening; and
    (g) an open bottom piece, fixedly attached to the housing, that facilitates temporary and removable attachment to the guide pole of the trailer.

* * * * *